United States Patent [19]

Ara et al.

[11] 4,423,629

[45] Jan. 3, 1984

[54] METHOD AND APPARATUS FOR SENSING LIQUID LEVEL

[75] Inventors: Katsuyuki Ara; Naoaki Wakayama, both of Ibaraki; Kazuo Kobayashi, Hitachi; Toshihiko Ogasawara, Ibaraki, all of Japan

[73] Assignees: Japan Atomic Energy Research Institute, Tokyo; Sukekawa Electric Co., Ltd., Ibaraki, both of Japan

[21] Appl. No.: 308,903

[22] Filed: Oct. 5, 1981

[30] Foreign Application Priority Data

Oct. 7, 1980 [JP] Japan .............................. 55-140289

[51] Int. Cl.³ ............................................ G01F 23/22
[52] U.S. Cl. ........................................ 73/295; 374/54
[58] Field of Search ........................... 73/295; 374/54; 340/622; 235/92 FL, 92 MT; 364/509

[56] References Cited

U.S. PATENT DOCUMENTS

2,702,476  2/1955  De Boisblanc ....................... 73/295
3,964,311  6/1976  Holmen ............................... 73/295

Primary Examiner—James J. Gill
Attorney, Agent, or Firm—Browdy and Neimark

[57] ABSTRACT

Method and apparatus for sensing liquid level of the invention includes a plurality of thermocouple elements that are formed by connecting two kind of thermocouple wires alternately in series into a plurality of thermometric contacts. The two kind of thermocouple wires have different thermoelectric powers SA and SB and have a variety of predetermined lengths. The invention can sense with high reliability a liquid level of a sensed liquid by changing electromotive forces from these thermocouple elements into binary signals by using fewer thermocouple elements than the conventional apparatus. The invention also includes thermocouple elements for parity check to self-diagnose the sensed result to inspect easily and securely errors in operation due to disconnections in the thermocouple elements or external noises.

3 Claims, 17 Drawing Figures

| LIQUIED LEVEL | TC1 | TC2 | TC3 | TC4 | PTC | TOTAL NUMBER OF 1 |
|---|---|---|---|---|---|---|
| 15 | 1 | 1 | 1 | 1 | 0 | 4 |
| 14 | 1 | 1 | 1 | 0 | 1 | 4 |
| 13 | 1 | 1 | 0 | 1 | 1 | 4 |
| 12 | 1 | 1 | 0 | 0 | 0 | 2 |
| 11 | 1 | 0 | 1 | 1 | 1 | 4 |
| 10 | 1 | 0 | 1 | 0 | 0 | 2 |
| 9 | 1 | 0 | 0 | 1 | 0 | 2 |
| 8 | 1 | 0 | 0 | 0 | 1 | 2 |
| 7 | 0 | 1 | 1 | 1 | 1 | 4 |
| 6 | 0 | 1 | 1 | 0 | 0 | 2 |
| 5 | 0 | 1 | 0 | 1 | 0 | 2 |
| 4 | 0 | 1 | 0 | 0 | 1 | 2 |
| 3 | 0 | 0 | 1 | 1 | 0 | 2 |
| 2 | 0 | 0 | 1 | 0 | 1 | 2 |
| 1 | 0 | 0 | 0 | 1 | 1 | 2 |
| 0 | 0 | 0 | 0 | 0 | 0 | 0 |
| | | | | | | ALL EVEN NUMBER |

| LIQUIED LEVEL | TC1 | TC2 | TC3 | TC4 | PTC | TOTAL NUMBER OF 1 |
|---|---|---|---|---|---|---|
| 14 | 0 | 0 | 0 | 1 | 0 | 1 |
| 13 | 0 | 0 | 1 | 0 | 0 | 1 |
| 12 | 0 | 0 | 1 | 1 | 1 | 3 |
| 11 | 0 | 1 | 0 | 0 | 0 | 1 |
| 10 | 0 | 1 | 0 | 1 | 1 | 3 |
| 9 | 0 | 1 | 1 | 0 | 1 | 3 |
| 8 | 0 | 1 | 1 | 1 | 0 | 3 |
| 7 | 1 | 0 | 0 | 0 | 0 | 1 |
| 6 | 1 | 0 | 0 | 1 | 1 | 3 |
| 5 | 1 | 0 | 1 | 0 | 1 | 3 |
| 4 | 1 | 0 | 1 | 1 | 0 | 3 |
| 3 | 1 | 1 | 0 | 0 | 1 | 3 |
| 2 | 1 | 1 | 0 | 1 | 0 | 3 |
| 1 | 1 | 1 | 1 | 0 | 0 | 3 |
| 0 | 1 | 1 | 1 | 1 | 1 | 5 |
| | | | | | | ALL ODD NUMBER |

METHOD AND APPARATUS FOR SENSING LIQUID LEVEL

BACKGROUND OF THE INVENTION

The present invention relates to a liquid level sensing system using thermocouples for sensing a level of water or other liquid in a nuclear reactor or a reactor pressurizer, and to a liquid level sensing apparatus used for practising said system.

Figures 1, 2:
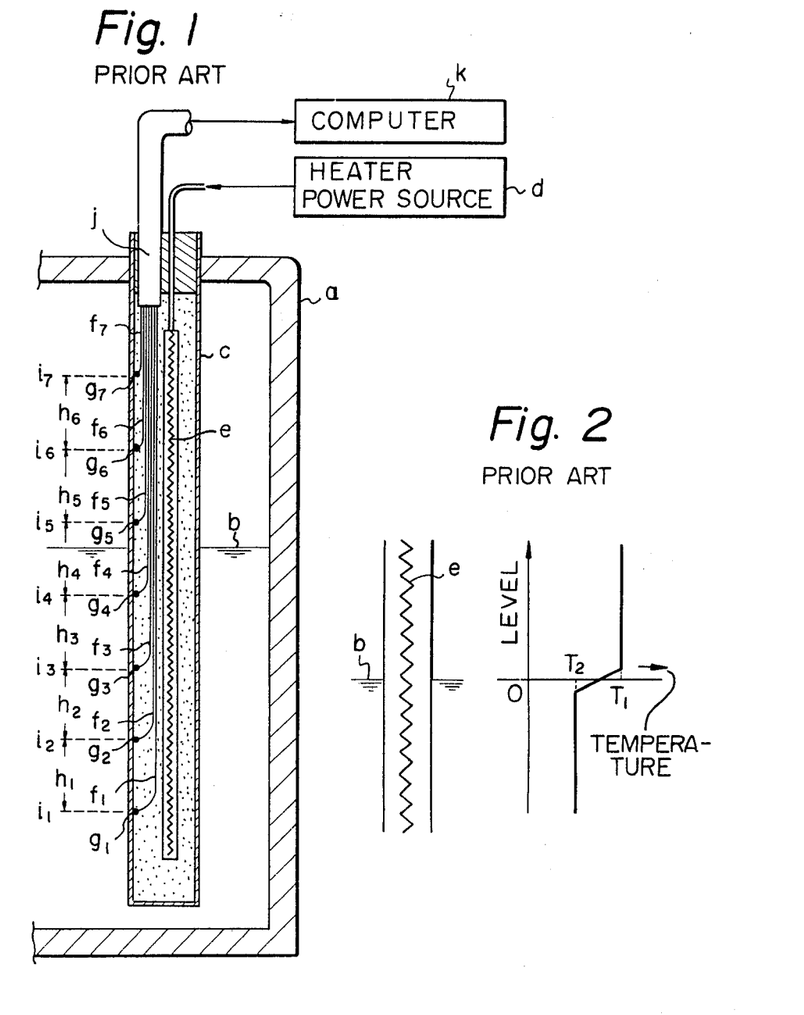
FIG. 1 is a partially sectional front view of a conventional water level sensing apparatus for a reactor pressurizer.
FIG. 2 is an illustration of a temperature gradient across the water level in the apparatus in FIG. 1.

FIG. 1 is a partially sectional front view of a conventional water level sensing apparatus for a reactor pressurizer, using thermocouple elements. In the conventional apparatus, as shown in FIG. 1, a metal pipe c is vertically charged into a water surface b within a reactor pressurizer a, said metal pipe c is provided therewithin with a heating element e heated by a heater power source d and thermocouple elements $f_1$, $f_2$, $f_3$—juxtaposed therewith, in which junctions of two kinds of thermocouple wires, that is, thermometric contacts $g_1$, $g_2$, $g_3$—of the thermocouple elements $f_1$, $f_2$, $f_3$—, respectively, are disposed on divider lines $i_1$, $i_2$, $i_3$—of sensing sections $h_1$, $h_2$, $h_3$—which are formed by dividing a water level sensing range into a desired number of sections, further these thermometric contacts $g_1$, $g_2$, $g_3$—are maintained under the uniform temperature conditions by said heating element e.

Accordingly, in the case where the water level b exists in the sensing section $h_4$, because the heat transfer rate of the gas phase above the water level b is different from the heat transfer rate of the liquid phase below the water level b, the thermometric contacts $g_1$, $g_2$, $g_3$—which were under the uniform temperature condition in the absence of water are now under different temperature conditions across the water level b, that is, as shown in FIG. 2, the thermometric contacts $g_5$–$g_7$ above the water level b are under a high temperature condition $T_1$ and the thermometric contacts $g_1$–$g_4$ below the water level b are under a low temperature condition $T_2$, and the temperature gradient thus formed is sensed by the contacts $g_1$–$g_4$ to thereby generate electromotive forces due to the temperature difference across the cold contact side j and the thermometric contact side of the thermocouple elements $f_1$–$f_4$. Therefore, the sensing section in which the temperature gradient is generated is confirmed by, for example, a computer k from these electromotive forces, to thereby sense the water level.

Accordingly, the conventional apparatus of the above-described construction had disadvantages that improvement in accuracy in the wide sensing range by reducing the length of each sensing section required a great number of dividing lines $i_1$, $i_2$, $i_3$—and the same number of the thermometric contacts, that is, several hundreds of the thermocouple elements $f_1$, $f_2$, $f_3$—each having only one thermometric contact, which necessitated an enlarged size of the apparatus and required much cost and labor to manufacture, and yet the apparatus thus manufactured would frequently break down to provide erroneous sensing results and further had no means for checking such erroneous sensing results.

SUMMARY OF THE INVENTION

An object of the present invention is to provide a liquid level sensing system and apparatus in which, without using a great number of thermocouple elements each having only one thermometric contact, such thermocouple elements that are formed by connecting two kinds of thermocouple wires alternately in series into a plurality of thermometric contacts are adequately adopted and electromotive forces from these thermocouple elements are changed into binary signals to thereby eliminate disadvantages of the conventional apparatus and to thereby make it possible to sense a water level in, for example, 256 points (dividing lines) using only eight elements (log 256/log 2=8) whereas in the conventional apparatus 256 thermocouple elements were required for the same purpose, and further to provide an apparatus having a self-diagnosing function capable of easily and securely inspecting errors in operation due to a disconnection in the thermocouple elements or an external noise, by means of thermocouple elements for parity check.

DESCRIPTION OF THE INVENTION

With reference now to the drawings the present invention will be described in detail.

Figure 3:
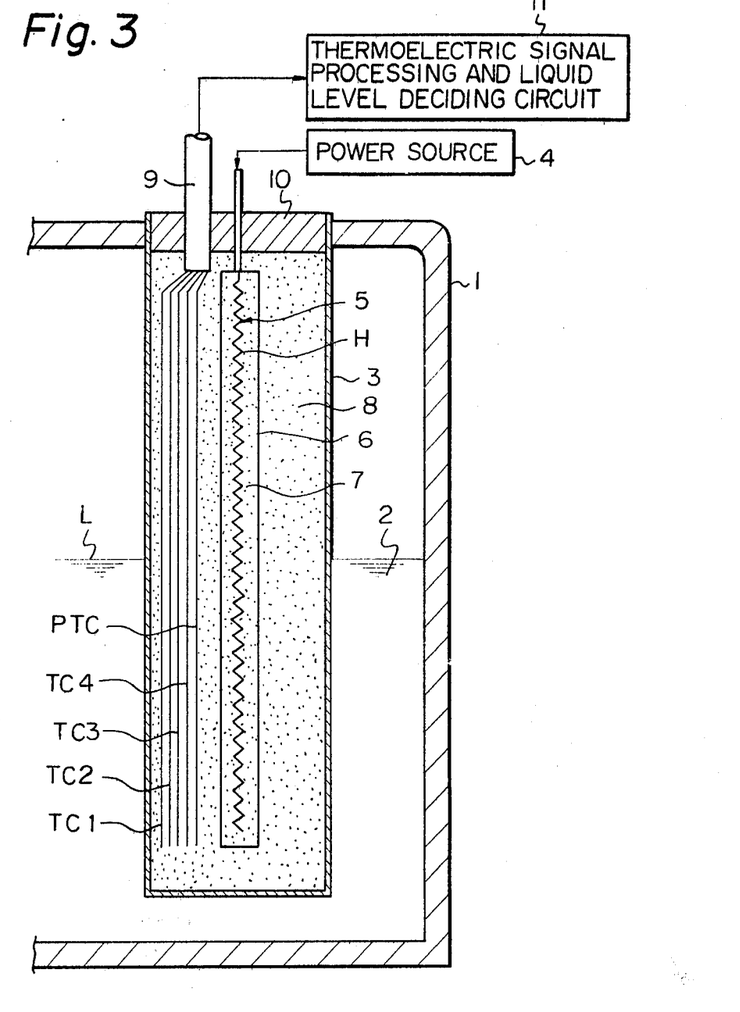
FIG. 3 is a partially sectional front view of an embodiment of the liquid level sensing apparatus according to the present invention.

FIG. 3 is a partially sectional front view of an embodiment of the liquid level sensing apparatus according to the present invention. As in the conventional apparatus, a bottomed metal pipe 3 is charged into a liquid 2 to be sensed in a vessel 1, and said metal pipe 3 is provided therein vertically with a heating element 5 heated by a power source 4. The heating element 5 illustrated comprises a metal sheath 6 provided therein with a heater H through an inorganic insulator 7. Said heater H is disposed axially of the metal pipe 3 as shown in FIG. 4.

Figure 4:
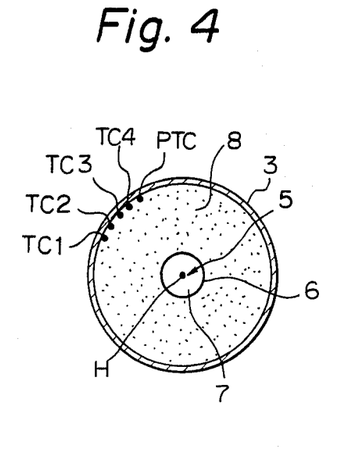
FIG. 4 is a cross sectional view of a metal pipe of FIG. 3.

FIG. 4 is a cross-sectional view of the metal pipe 3 of FIG. 3. Thermocouple elements TC1, TC2, TC3, TC4—are provided with a vertically uniform temperature condition by said heating element 5. In the illustrated embodiment, the thermocouple elements are disposed, as shown in FIG. 4, vertically along the inner surface of the metal pipe 3 which is filled with a heat conductor 8. However, these thermocouple elements TC1, TC2, TC3, TC4—may, of course, be disposed in the outside of the metal pipe 3 or within the metal sheath 6 of the heating element 5.

Further, denoted by PTC in FIGS. 3 and 4 is a thermocouple element for parity check disposed vertically adjacent to the thermocouple elements TC1, TC2, TC3, TC4—, a cold contact side 9 of which is guided out through a top cover 10 of the metal pipe 3 and connected to a thermocouple signal processing and liquid level deciding circuit 11.

Figure 5:
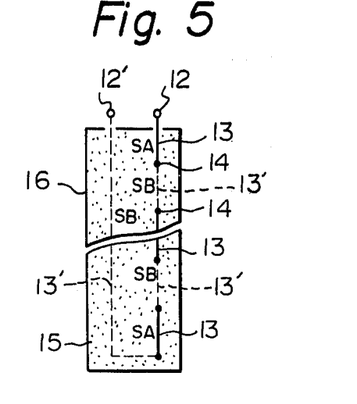
FIG. 5 is a sectional front view of an embodiment of a thermocouple element to be used in the liquid level sensing apparatus according to the present invention.

FIG. 5 is a sectional front view of an embodiment of a thermocouple element used in the liquid level sensing apparatus according to the present invention. The thermocouple elements and the thermocouple elements for parity check are of the basic construction formed by, as shown in FIG. 5, connecting alternately in series two kinds of thermocouple wires 13 and 13' having thermoelectric powers SA and SB, respectively, between cold contact side terminals 12 and 12' so as to dispose one or more thermometric contacts 14, 14'—in series beneath the cold contact side terminal 12. In the illustrated embodiment, said thermocouple wires 13 and 13' are disposed within a metal sheath 16 through an inorganic insulator 15. In the present invention, the thermocouple elements TC1, TC2, TC3, TC4—having the basic construction described above are disposed vertically and adjacent to each other as shown in FIGS. 12 and 13 to be described in greater detail hereinunder. The thermometric contacts 14, 14—of the thermocouple elements are disposed on dividing lines N of sensing sections M formed by dividing the desired liquid level sensing range into a desired number of sections (M = 15 in FIG. 12 and 14 in FIG. 13, respectively). These thermometric contacts 14, 14—of the thermocouple elements TC1, TC2, TC3, TC4 are provided in numbers varying from the largest (TC4) that is equal to the number of the dividing lines to the smallest (TC1 in FIG. 12 and TC1 in FIG. 13) that is one or two, and are provided with differences in phase from one another.

Figure 6:
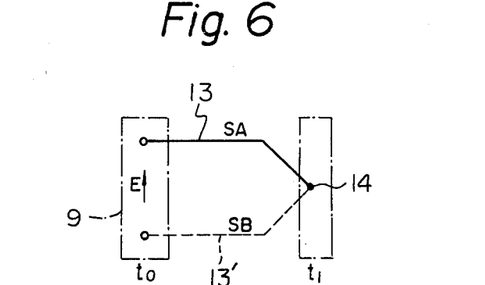
FIG. 6 is an illustration of an electromotive force of the thermocouple element having one thermometric contact.

FIG. 6 is a view for illustrating an electromotive force of the thermocouple element having one thermometric contact. The electromotive force generated between the cold contact side terminals 12 and 12' by said thermocouple elements TC1, TC2, TC3, TC4—is utilized also in the present invention. Before describing the special means for utilizing the electromotive force, consideration will now be given to the matter what kind of electromotive force is generated. Firstly, in the thermocouple element having only one thermometric contact 14 by the thermocouple wires 13 and 13' having thermoelectric powers SA and SB, respectively, as shown in FIG. 6, if there is no difference between a temperature $t_0$ on the side of the cold contact 9 and a temperature $t_1$ on the side of the thermometric contact 14, there will be no electromotive force E, that is E=0, however, on the contrary, if there is a temperature difference therebetween, there will be generated an electromotive force E corresponding to the temperature gradient thereby, and the value of the electromotive force E is expressed by the following equation:

$$E = \int_{t_0}^{t_1} SAdt + \int_{t_1}^{t_0} SBdt = \int_{t_0}^{t_1} (SA - SB)dt$$

Figure 7:
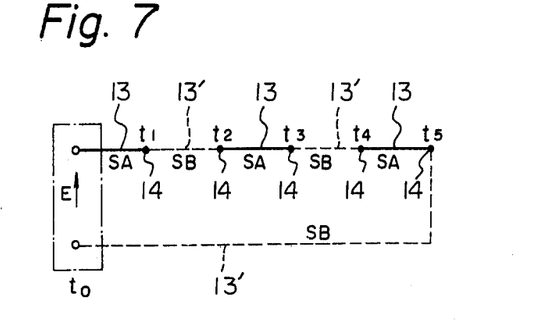
FIG. 7 is an illustration of an electromotive force of the thermocouple element having a plurality of thermometric contacts.

FIG. 7 is a view for illustrating an electromotive force of the thermocouple having a plurality of thermometric contacts. In the thermocouple element in which the thermocouple wires 13 and 13' having the thermoelectric powers SA and SB, respectively, are connected alternately in series as described hereinabove to provide a plurality of thermometric contacts 14, 14—, the electromotive force E is expressed as the sum of the electromotive forces of the thermocouple wires 13 and 13' by the following equation, in which $t_1$-$t_5$ denote temperatures at the thermometric contacts 14, 14—, respectively:

$$E = \int_{t_0}^{t_1} SAdt + \int_{t_1}^{t_2} SBdt + \int_{t_2}^{t_3} SAdt + \int_{t_3}^{t_4} SBdt +$$
$$\int_{t_4}^{t_5} SAdt + \int_{t_5}^{t_0} SBdt$$

Figure 8:
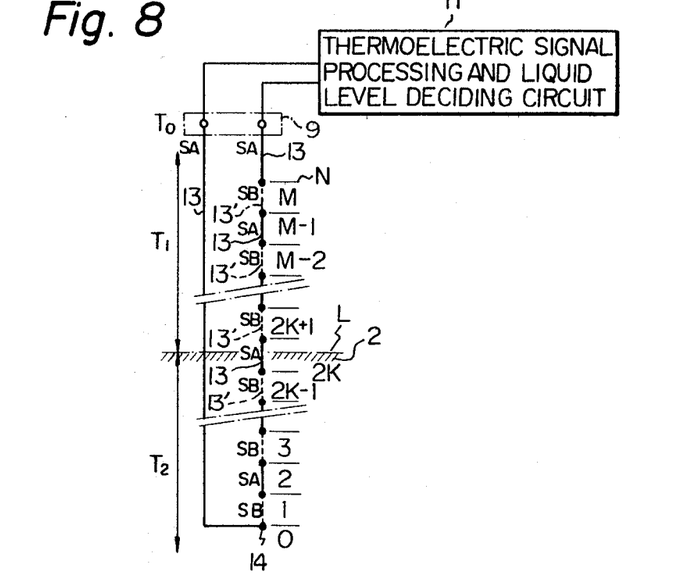
FIG. 8 is an illustration of an electromotive force of the thermocouple element according to the present invention, having an odd number of the sensing section dividing lines.

FIG. 8 is a view for illustrating an electromotive force of the thermocouple element according to the present invention having an odd number of the sensing sections. Consideration will now be given to the electromotive force in the thermocouple element used in the present invention in which the number M of the sensing sections is odd number, the temperature of the cold contact side 9 is $T_0$, the temperature of the phase (gas phase) above the liquid level L of the liquid 2 to be sensed is $T_1$, and the temperature of the phase (liquid phase) below the liquid level L is $T_2$. Now, in the case where the liquid level L exists in the sensing section numbered 2K which is an even number, the thermocouple wire 13 on the left side in FIG. 8 senses a temperature gradient by $T_0$, $T_1$ and $T_2$, and the thermocouple wire 13 numbered 2K on the right side in FIG. 8 senses a temperature gradient ($T_1$, $T_2$) by the difference in the heat transfer rate between the phase above the liquid level and the phase below the liquid level, and, at the same time, the thermocouple wire 13 at the uppermost on the right side in FIG. 8 senses the temperature gradient by $T_0$ and $T_1$. Therefore, the sum of electromotive forces by the three thermocouple wires 13, 13, 13, respectively, is the electromotive force (output) E of the thermocouple element shown in FIG. 8, which is expressed by the following equation:

$$E = \int_{T_0}^{T_2} SAdt + \int_{T_2}^{T_1} SAdt + \int_{T_1}^{T_0} SAdt = 0$$

Accordingly, in the case where M is an odd number and the liquid level exists in an even-numbered sensing section, the output is zero.

Further, in the case where the liquid level exists in a sensing section numbered 2K-1 which is an odd number, the output E is, as will be clear from the above-described consideration, expressed as follows:

$$E = \int_{T_0}^{T_2} SAdt + \int_{T_2}^{T_1} SBdt + \int_{T_1}^{T_0} SAdt$$

$$= \int_{T_1}^{T_2} SAdt + \int_{T_2}^{T_1} SBdt$$

$$= \int_{T_1}^{T_2} (SA - SB)dt$$

Further, in the case where the liquid level L falls to the section numbered 0 below the lowest thermometric contact 14, the output E is as follows:

$$E = \int_{T_0}^{T_1} SAdt + \int_{T_1}^{T_2} SAdt = 0$$

Figure 9A:
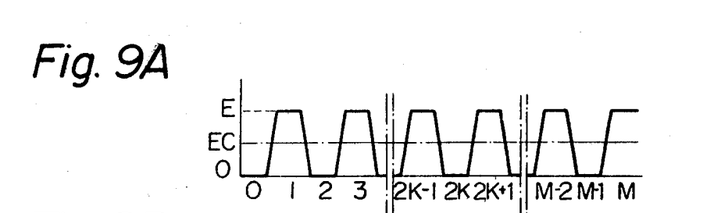
FIG. 9(a) is an output waveform diagram corresponding to FIG. 8.

As the result, the electromotive force by the thermocouple element of FIG. 8 generates output of any of the wave forms shown in FIG. 9(a) according to in which sensing section the liquid level L exists.

Figure 9B:
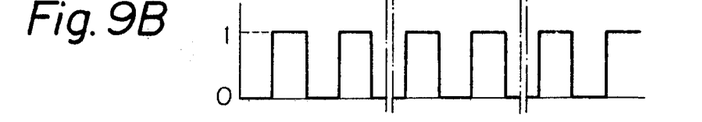
FIG. 9(b) is a binary signal waveform diagram thereof.

In the present invention, therefore, the output corresponding to the liquid level L is applied to the thermocouple signal processing and liquid level deciding circuit 11, in which said output wave form is compared with a reference level EC to thereby obtain binary signals shown in FIG. 9(b) so as, if the liquid level is in the sensing section 0 or any of the even-numbered sensing sections, to provide the binary signal "0" and, if the liquid level is in any of the odd-numbered sensing sections, to provide the binary signal "1".

Figure 10:
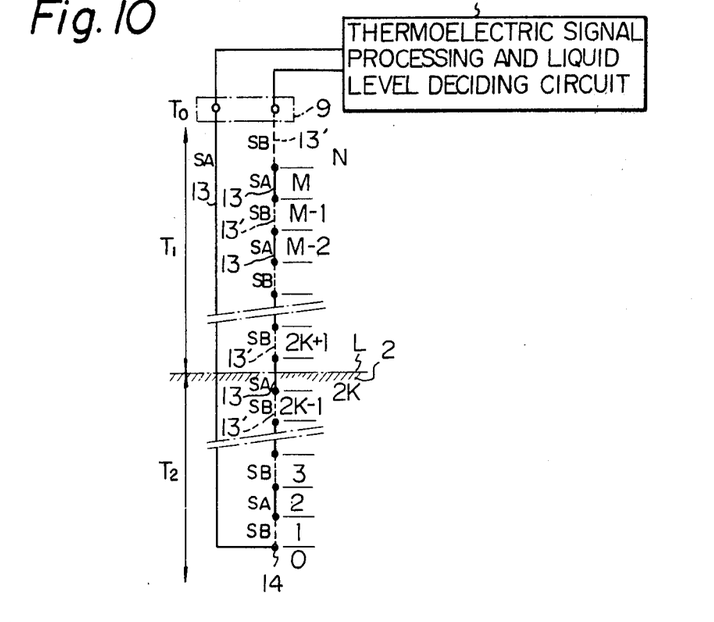
FIG. 10 is an illustration of an electromotive force of the thermocouple element according to the present invention, having an even number of the sensing section dividing lines.

FIG. 10 is a view for illustrating an electromotive force of the thermocouple element according to the present invention having an even number of the sensing sections. Considering the electromotive force E to be generated thereby, in the case where the liquid level L is in the even-numbered sensing section 2K, the output E is as follows:

$$E = \int_{T_0}^{T_2} SAdt + \int_{T_2}^{T_1} SAdt + \int_{T_1}^{T_0} SBdt$$

$$= \int_{T_0}^{T_1} SAdt + \int_{T_1}^{T_0} SBdt$$

$$= \int_{T_0}^{T_1} (SA - SB)dt$$

On the other hand, in the case where the liquid level is in the odd-numbered sensing section 2K-1, the output is as follows:

$$E = \int_{T_0}^{T_2} SAdt + \int_{T_2}^{T_1} SBdt + \int_{T_1}^{T_0} SBdt$$

$$= \int_{T_0}^{T_2} SAdt + \int_{T_2}^{T_0} SBdt$$

$$= \int_{T_0}^{T_2} (SA - SB)dt$$

Further, in the case where the liquid level L falls to the section numbered 0, the output is as follows:

$$E = \int_{T_0}^{T_1} SAdt + \int_{T_1}^{T_0} SBdt$$

$$= \int_{T_0}^{T_1} (SA - SB)dt$$

Figure 11A:
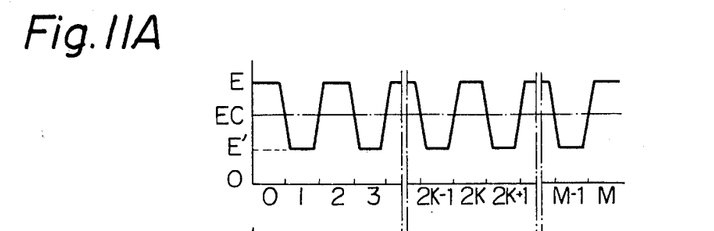
FIG. 11(a) is an output waveform diagram corresponding to FIG. 10.
Figure 11B:
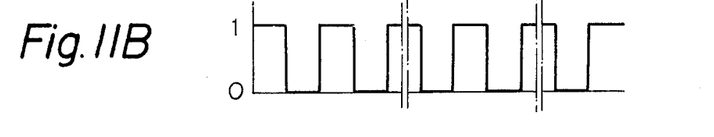
FIG. 11(b) is a binary signal waveform diagram thereof.

As the result, the electromotive force by the thermocouple element of FIG. 10 generates output of any of the wave forms shown in FIG. 11(a) according to in which sensing section the liquid level exists. Accordingly, said output is applied to the thermocouple signal processing and liquid level deciding circuit 11, in which said output wave form is compared with the reference level EC to thereby obtain binary signals shown in FIG. 11(b) so as, if the liquid level is in the sensing section 0 or any of the even-numbered sensing sections, to provide the binary signal "1" and, if the liquid level is in any of the odd-numbered sensing sections, to provide the binary signal "0".

Based on the foregoing explanation, the present invention will now be described in greater detail with reference to FIGS. 12 and 13, both of which show embodiments using four thermocouple elements TC1, TC2, TC3 and TC4. Particularly, in the embodiment shown in FIG. 12 the number M of the sensing sections is odd (M=15) and in the embodiment shown in FIG. 13 the number M of the sensing sections is even (M=14).

In the embodiment shown in FIG. 12, the thermometric contacts 14, 14—of the thermocouple element TC4 are provided in the number (16) corresponding to the number of the dividing lines N. In the thermocouple element TC3, the thermometric contacts 14, 14—are provided with two sensing sections as a unit beginning with the uppermost dividing line, and the lowermost thermometric contact 14 is one sensing section higher than that of the thermocouple element TC4. In the thermocouple element TC2, the thermometric contacts 14, 14—are provided with four sensing sections, that is double that of the thermocouple element TC3, as a unit beginning with the uppermost dividing line, and the lowermost thermometric contact 14 is two sensing sections higher than that of the thermocouple element TC3. In the thermocouple element TC1, the number of the unit sensing sections of the thermometric contacts 14—is eight, the number of the thermometric contacts is two, and the thermocouple element TC1 is four sensing sections shorter in length than the thermocouple element TC2.

Figures 12A, 12B:
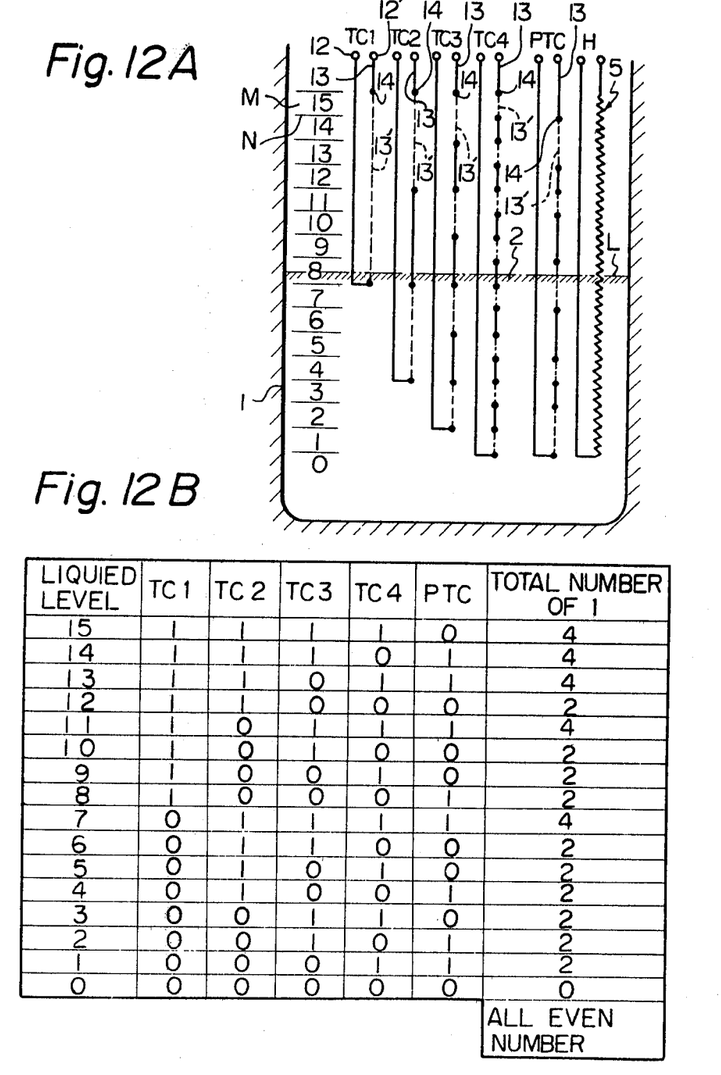
FIG. 12(a) is a front view of an example of arrangement of the thermocouple elements (four bits) having an odd number of the sensing sections.
FIG. 12(b) is a table of permutation of the binary signals corresponding to FIG. 12(a)

FIG. 12(a) is a front view illustrating an embodiment of arrangement of the thermocouple elements (4 bits) each having an odd number of the sensing sections. FIG. 12(b) is a table of permutations of the binary signals corresponding to the embodiment of FIG. 12(a). That is, in the arrangement of the thermocouple elements as shown in FIG. 12(a), the binary signals of the electromotive forces by each of the thermocouple elements are as shown in FIG. 12(b). In the embodiment of FIG. 12(a), since M is an odd number, if the liquid level L is in the section corresponding to the thermocouple wire 13 (shown by a solid line) having the thermoelectric power SA, as described with reference to FIGS. 8 and 10, its binary signal will be "0", and if the liquid level L is in the section corresponding to the thermocouple wire 13' (shown by a dashed line) having the thermoelectric power SB, its binary signal will be "1". Accordingly, in the case where the liquid level L is in the sensing section numbered, for example, 8 (even number), the permutation of the binary signals in the thermocouple elements TC1, TC2, TC3 and TC4 is, as seen from FIG. 12(b), as follows:

| TC1 | TC2 | TC3 | TC4 |
|-----|-----|-----|-----|
| "1" | "0" | "0" | "0" |

In the case where the liquid level L is in any of other sensing sections, if it corresponds to a solid line, its signal is "0", if it corresponds to a dashed line, its signal is "1", and if it corresponds to no thermocouple wire, its signal is "0". Thus, the list of FIG. 12(b) is obtained. Accordingly, in the embodiment shown in FIG. 12(a) since the permutations of the binary signals of the sensing sections 1-15 are different from one another, it is easily indicated in which sensing section the liquid level L exists by deciding the type of the permutation by means of said thermocouple signal processing and liquid level deciding circuit 11.

Figure 13A:
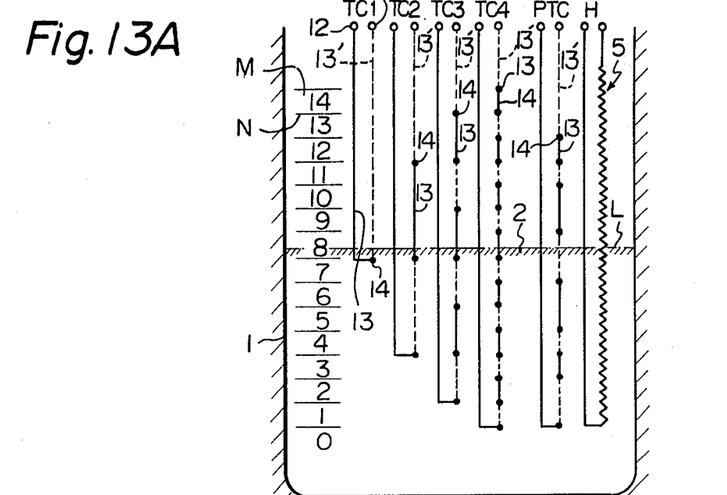
FIG. 13(a) is a front view similar to FIG. 12(a), having an even number of the sensing sections.
Figure 13B:
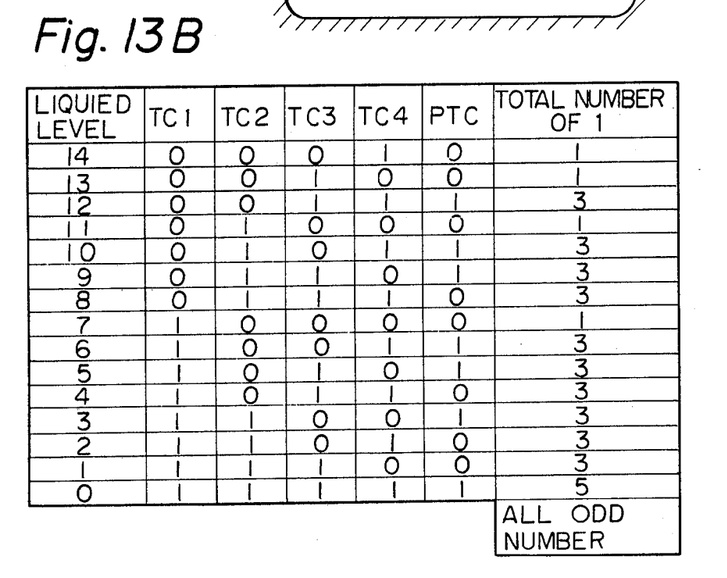
FIG. 13(b) is a table of permutation of the binary signals corresponding to FIG. 13(a).

FIG. 13(a) is a front view illustrating an embodiment of arrangement of the thermocouple elements (4 bits) each having an even number of the sensing sections. FIG. 13(b) is a table of permutations of the binary signals corresponding to the embodiment of FIG. 13(a). In this embodiment also, as will be clear from the explanation with reference to FIGS. 10 and 11, since the number of the sensing sections is even, the binary signals obtained are "1" in the section corresponding to a solid line, "0" in the section corresponding to a dashed line, and "1" in the section corresponding to no thermocouple wire. Thus, the permutations of the signals are as shown in FIG. 13(b). Therefore, it is possible to find out the sensing section in which the liquid level exists by examining the type of the permutation of the signals, to thereby measure the liquid level.

The above-mentioned thermocouple elements for parity check PTC will now be described in detail. In the embodiments shown in FIGS. 12 and 13, each of the thermocouple elements TC1–TC4 is provided with the thermometric contacts 14, 14—spaced equally, for example, one sensing section or two sensing sections, from one another. In the thermocouple elements for parity check PTC, however, the thermometric contacts 14, 14—are not spaced equally from one another, that is they are spaced from one another one sensing section is some phaces and two sensing sections in others.

In the thermocouple element PTC of the embodiment shown in FIG. 12(a), the binary signals shown in the right-most column of FIG. 12(b) are generated correspondingly to the sensing sections by the arrangement of the thermocouple wires 13 and 13' corresponding to the solid and dashed lines of FIG. 12(a). For example, in the sensing section 7, the binary signals are:

| TC1 | TC2 | TC3 | TC4 | P |
|-----|-----|-----|-----|---|

-continued

| "0" | "1" | "1" | "1" | "1" |
|-----|-----|-----|-----|-----|

This means that the thermometric contacts 14, 14—of the thermocouple element PTC are so prearranged that the number of bits of "1" in the permutation of the binary signals of the thermocouple elements TC1–TC4 is three, to which the binary signal "1" by the thermocouple element for parity check PTC is added to make the total number of said bits four (even number).

In other sensing sections, for example in section 1, there are two binary "1", that is one by TC4 and the other by PTC. In section 2 there are two binary "1", that is one by TC3 and the other by PTC. In section 3 there are two binary "1", that is one by TC3 and the other by TC4, in this case the signal from PTC is "0". In this way, the total number of the binary "1" in each of the sensing sections is always even. Of course, the thermometric contacts 14, 14—of the thermometric element PTC may be so prearranged that the total number of said bits is always odd. For example, in sensing section 7 of the embodiment shown in FIG. 13, the binary signals are:

| TC1 | TC2 | TC3 | TC4 | PTC |
|-----|-----|-----|-----|-----|
| "1" | "0" | "0" | "0" | "0" | that is, the binary signal of the thermocouple element PTC is "0" to make the total number of binary "1" one (odd number). The thermocouple element PTC generates binary signals so as to make the total number of binary "1" in any of all other sensing sections odd. Accordingly, by confirming whether the total number of binary "1" in a sensing section becomes even or odd as predetermined, such erroneous operations as by an disconnection in any of TC1–TC4 or an external noise can be discovered.

In the sensing system according to the present invention, as described in the embodiments shown in the drawings, a desired plurality of thermocouple elements TC1, TC2, TC3, TC4—maintained under a uniform temperature condition by the heating elements 5 and having different numbers of the thermometric contacts are charged into the liquid 2 to be sensed in such a manner that said thermometric contacts 14, 14—are disposed on the dividing lines N of the sensing sections M formed by dividing the desired liquid level sensing range into a desired number of sections, when said thermocouple elements sensed a temperature gradient due to the difference in heat transfer rate of the liquid to be sensed in the phases above and below the liquid level, electromotive forces generated thereby in the thermocouple elements are guided out of the cold contact side as binary signals of "0" and "1", and the sensing section in which the level of the liquid to be sensed exists is decided by the type of permutation of said binary signals. In the present invention, accordingly, even in the case where the sensing section is made smaller than in the conventional sensing systems to increase the accuracy, the sensing result is obtained by processing of a very small number of the signals. Further, since the sensing section is decided by processing of the binary signals, the sensing of the liquid level is rendered in a high reliability.

Further, in the sensing apparatus to be used in said system, the metal pipe 3 to be charged vertically into the liquid to be sensed is provided therein vertically with the heating element 5 heated by the power source 4 and a desired plurality of the thermocouple elements TC1, TC2, TC3, TC4—which are provided by said heating element 5 with a vertically uniform temperature condition and are capable of sensing external temperature, said thermocouple elements are formed by connecting two kinds of thermocouple wires 13 and 13' alternately in series by thermometric contacts 14 and leading out a pair of the terminals 12 on the cold contact side to the outside, said thermometric contacts of the thermocouple elements are disposed on the dividing lines N of the sensing sections M formed by dividing the desired liquid level sensing range into a desired number of the sections, which are provided in numbers ranging from the highest which is equal to the number of the dividing lines to the lowest which is one or two, are provided with differences in phase from one another, and the terminals 12 and 12' on the cold contact side of the thermocouple elements, when said thermocouple elements sensed a temperature gradient by the difference in heat transfer rate of the liquid 2 to be sensed in the phases above and below the liquid level, change the electromotive forces generated thereby in the thermocouple elements into binary signals of "0" and "1" and connect them to a thermocouple signal processing and liquid level deciding circuit 11 which decides in which sensing section said liquid level exists by permutation of said binary signals. In the apparatus according to the present invention, therefore, the number of the required thermocouple elements can be drastically reduced from several hundreds in the conventional apparatus to only several for the relation of log M/log 2, to thereby make the manufacture thereof easier, reduce the cost, increase the reliability, and make the apparatus smaller in size.

Still further, in the sensing apparatus according to the present invention, binary signals are provided not only by the above described apparatus but also by the thermocouple elements for parity check, and the thermometric contacts of said thermocouple elements for parity check are so selected in position that will generate such binary signals that the sum of number of "1" included in the permutation of the binary signals by said thermocouple elements and the binary generated upon sensing of said temperature gradient by said thermocouple element for parity check is always an even or odd number. Accordingly, troubles as by disconnection in the thermocouple elements and external noise can be checked by deciding whether said sum is odd or even, and a self diagnosis of error in operation for sensing the liquid level can be made easily.

What is claimed is:

1. A liquid level sensing method, characterized in that a desired plurality of thermocouple elements maintained under a uniform temperature condition by a heating element and having different numbers of thermometric contacts are charged into a liquid to be sensed in such a manner that said thermometric contacts are disposed on dividing lines of sensing sections formed by dividing a desired liquid level sensing range into a desired number of sections, when said thermocouple elements sensed a temperature gradient due to the difference in heat transfer rate of the liquid to be sensed in the phases above and below the liquid level, electromotive forces generated thereby in the thermocouple elements are guided out of the cold contact side as binary signals of "0" and "1", and the sensing section in which the level of the liquid to be sensed exists is decided by the type of permutation of said binary signals.

2. A liquid level sensing apparatus characterized in that a metal pipe to be charged vertically into a liquid to be sensed is provided therein vertically with a heating element heated by a power source and a desired plurality of thermocouple elements which are provided by said heating element with a vertically uniform temperature condition and are capable of sensing external temperature, said thermocouple elements are formed by connecting two kinds of thermocouple wires alternately in series by thermometric contacts and leading out a pair of terminals on cold contact side to outside, said thermometric contacts of the thermocouple elements are disposed on dividing lines of sensing sections formed by dividing a desired liquid level sensing range into a desired number of sections, which are provided in numbers ranging from the highest which is equal to the number of the dividing lines to the lowest which is one or two, are provided with differences in phase from one another, and the terminals on cold contact side of the thermocouple elements, when said thermocouple elements sensed a temperature gradient by the difference in heat transfer rate of the liquid to be sensed in the phase above and below the liquid level, changed the electromotive forces generated thereby in the thermocouple elements into binary signals of "0" and "1" and connect them to a thermocouple signal processing and liquid level deciding circuit which decides in which sensing section said liquid level exists by permutation of said binary signals.

3. A liquid level sensing apparatus characterized in that a metal pipe to be charged vertically into a liquid to be sensed is provided therein vertically with a heating element heated by a power source, a desired plurality of thermocouple elements which are provided with a vertically uniform temperature condition and are capable of sensing external temperature, and thermocouple elements for parity check, both said thermocouple elements are formed by connecting two kinds of thermocouple wires alternately in series by thermometric contacts and leading out a pair of terminals on cold contact side to outside, said thermometric contacts are disposed on dividing lines of sensing sections formed by dividing a desired liquid level sensing range into a desired number of sections, said thermometric contacts of the thermocouple elements are provided in numbers ranging from the highest which is equal to the number of the dividing lines to the lowest which is one or two and are provided with differences in phase from one another, the terminals on cold contact side of the thermocouple elements, when said thermocouple elements sensed a temperature gradient by the difference in heat transfer rate of the liquid to be sensed in the phases above and below the liquid level, change the electromotive forces generated thereby in the thermocouple elements into binary signals of "0" and "1" and connect them to a thermocouple signal processing and liquid level deciding circuit which decides in which sensing section said liquid level exists by permutation of said binary signals, and the thermometric contacts of said thermocouple elements for parity check are so selected in position that will generate such binary signals that the sum of number of "1" included in the permutation of the binary signals by said thermocouple elements and the binary signal of the electromotive force generated upon sensing of said temperature gradient by said thermocouple elements for parity check is always an odd or even number.

* * * * *

UNITED STATES PATENT AND TRADEMARK OFFICE
CERTIFICATE OF CORRECTION

PATENT NO. : 4,423,629
DATED : Jan. 3, 1984
INVENTOR(S) : ARA et al.

It is certified that error appears in the above-identified patent and that said Letters Patent are hereby corrected as shown below:

On the title page, Item [73] should read:
[73] Assignees: Japan Atomic Energy Research Institute, Tokyo; Sukegawa Electric Co., Ltd., Ibaraki, both of Japan Column 5, line 20, should read, $- E = \int_{T_0}^{T_1} SAdt + \int_{T_1}^{T_0} SAdt = 0$ --.

Signed and Sealed this

Twenty-fourth Day of July 1984

[SEAL]

Attest:

GERALD J. MOSSINGHOFF

*Attesting Officer*  *Commissioner of Patents and Trademarks*